UNITED STATES PATENT OFFICE.

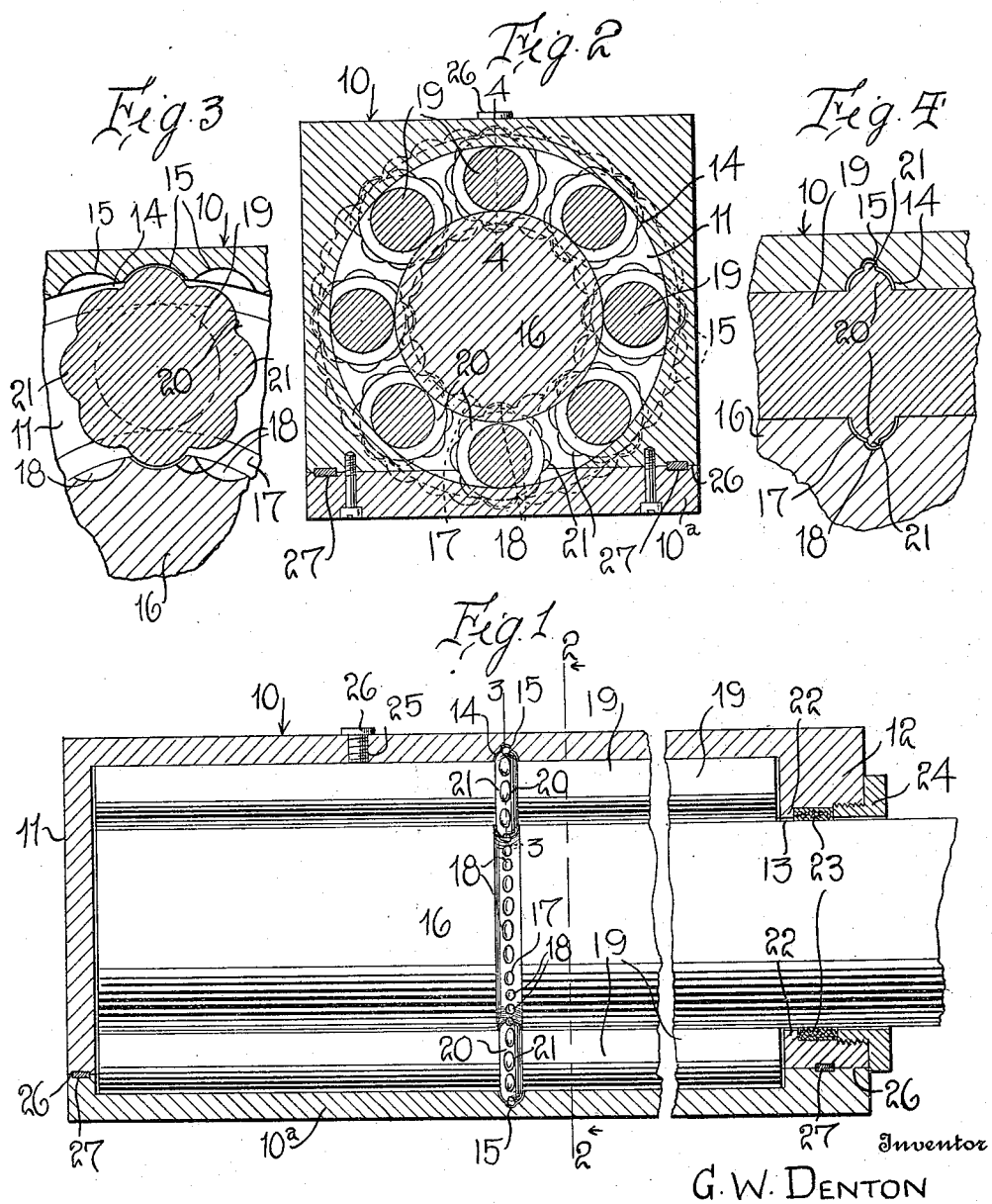

GEORGE W. DENTON, OF LAPORTE, INDIANA.

JOURNAL-BEARING.

1,216,781. Specification of Letters Patent. Patented Feb. 20, 1917.

Application filed February 25, 1916. Serial No. 80,502.

*To all whom it may concern:*

Be it known that I, GEORGE W. DENTON, a citizen of the United States, residing at Laporte, in the county of Laporte and State of Indiana, have invented certain new and useful Improvements in Journal-Bearings, of which the following is a specification, reference being had to the accompanying drawings.

This invention relates to journal bearings, and particularly to roller bearings.

The general object of this invention is to provide a very simple and effective journal bearing which is so constructed that no oil-soaked packing will be necessary and which will thus eliminate to a large degree chance of railway cars being set on fire by hot boxes, in which no dust can get into the bearings to cause friction, and in which hard oil or other lubricant may be used.

A further object of the invention is to so construct the journal bearing that the antifriction rollers are held from frictional engagement with each other and also held from frictional engagement with the end walls of a box in which the rollers are disposed so as to thereby reduce the friction to a minimum.

A further object is to provide means whereby dust and dirt can be kept out of the bearing and to provide means whereby the bearing rollers may be readily inserted into the box or removed therefrom.

Other objects will appear in the course of the following description.

I have illustrated my invention as applied to a bearing within which a shaft or axle terminates, but it will be understood that the principle of invention is equally applicable to bearings wherein the journal or shaft passes entirely through the journal box.

My invention is illustrated in the accompanying drawings, wherein:

Figure 1 is a longitudinal sectional view of a journal bearing constructed in accordance with my invention, the shaft and roller bearings being in elevation;

Fig. 2 is a section on the line 2—2 of Fig. 1;

Fig. 3 is a detail sectional view on the line 3—3 of Fig. 1;

Fig. 4 is an enlarged fragmentary sectional view on the line 4—4 of Fig. 2.

Referring to these drawings, 10 designates the journal box itself which is preferably rectangular in form, the interior being formed to provide a cylindrical chamber closed at one end by the wall 11 and at the other end partly closed by the annular wall 12 which defines a shaft opening 13. The inner face of the wall 10 midway between the ends of the boxing is formed with a peripheral groove 14. This groove is semicircular in cross section and is provided at certain intervals with depressions or pockets 15 at uniformly spaced intervals, the purpose of which will be later stated. The shaft, arbor or axle 16 is of course cylindrical in form and enters the boxing through the opening 13, and this shaft is formed upon its periphery with the circumferentially extending peripheral groove or depression 17 which is semi-cylindrical in cross section and which is formed at uniformly spaced intervals with the depressions or pockets 18, these depressions or pockets being spaced apart the same distance from each other that the pockets 15 are spaced.

Disposed between the shaft 16 and the circumferential wall of the boxing are a plurality of rollers 19. Each of these rollers has a length slightly less than the distance between the wall 12 and the wall 11, and a diameter the same as the distance between the face of the shaft 16 and the inner face of the boxing. Midway of its ends each of the rollers 19 is formed with a flange 20. The outer face of the flange is transversely rounded so as to accurately fit the semi-circular groove 14 in the wall of the boxing and the semi-circular groove 17 in the shaft, and the flange 20 is formed at uniformly spaced intervals with the outwardly projecting protuberances 21, which may be termed sprocket teeth, which are adapted to engage in the depressions or pockets 15 and 18 and mesh therewith. The roller bearings are disposed as illustrated in Fig. 2 at spaced intervals from each other, and the purpose of these sprocket teeth 21 upon the bearings and of the pockets 15 and 18 upon the boxing and shaft respectively, is to prevent the rollers 19 from coming in contact with each other; and thus eliminate the friction of the rollers upon each other. These pockets and interengaging sprockets act to hold the rollers at spaced intervals all around the shaft and in the raceway formed between the circumferential periphery of the shaft and the internal surface of the box. The purpose of the flanges 20 is to prevent any longitudinal movement of the rollers relative to the shaft and relative to the box so that the ends of the rollers will be held in spaced relation to the end walls 11 and 12 of the box and thus eliminate any friction of the rollers against the ends of the box.

As illustrated in Fig. 1, the wall 12 is formed with a shoulder 22 which defines the opening 13 and which approximately fits the shaft 16. Outward beyond this shoulder the face of the shaft opening 13 is spaced a greater distance from the shaft so as to receive a packing 23 which will prevent the entrance of dust into the interior of the bearing. This packing is held in place by a collar 24 having screw threaded engagement with the boxing but not engaging the shaft, this collar holding the packing in place. This collar may be turned up at intervals so as to compress the packing as the packing wears. In order to permit the introduction of oil into the boxing, the top wall of the box is preferably provided with an opening 25 which is ordinarily closed by a plug 26. Thus lubricant may be readily forced into the interior of the box and lubricant will be distributed by the travel of the several rollers. On a line below the shaft 16, the boxing is longitudinally cut on the line 26 so that the roller bearings may be readily inserted in place, and this lower section 10ᵃ of the boxing is held in engagement with the upper section 10 by means of screws or other suitable devices. A gasket 27 should also be disposed within a recess formed in the abutting faces of the sections so as to keep out dust.

The grooves 14 and 17 are to be case-hardened and the flanges 20 should also be case-hardened. It is to be particularly noted that the flanges are so formed in cross section and the grooves 14 and 17 are so formed that the flanges do not rest on the bottom of the groove and therefore there is no weight on the flanges. There is, therefore, no danger of the flanges breaking. The flanges are for the purpose of holding the rollers from frictional contact with the end walls of the box and the relatively shallow pockets 18 and 15 and the relatively shallow protuberances or sprocket teeth 21 are for the purpose of preventing the rollers from contacting with each other. The sprockets 21 are very shallow, as are the pockets 15 and 18, and it is to be noted that the sprocket teeth and the pockets in the grooves of the shaft and boxing do not extend clear across the flanges and the grooves, respectively, but that the face of the grooves 14 and 17 and the face of the flange is rounded off to the edge to thereby give a solid flange bearing clear around.

It will be obvious that in my improved boxing there is no necessity of using oil-soaked cotton waste. There is no danger of the boxing getting hot and therefore no danger of setting fire to this oil-soaked cotton waste, thereby endangering the car on which the axle and boxing is mounted. Furthermore, no hot box is possible, which thus reduces chance of wrecks. No dirt can pass the interior of the boxing and it is obvious that the bearing will run very easily, thus saving coal. It is also obvious that inasmuch as this bearing uses hard oil or other lubricant, the lubricant will last a considerably greater length of time and thus a saving will be effected. The hard lubricant can not get out and thus the bearing will not need re-oiling for a very great length of time.

Attention is particularly called to the fact that the pockets 15 and the protuberances 21 are set so close together that each sprocket or protuberance must commence to enter a pocket before the next adjacent sprocket or protuberance leaves its pocket, as unless this is the case there would be an instant when no protuberances or sprockets would enter the proper pockets and the rollers 19 could shift toward or from each other and get out of line with the pockets and thus would not be spaced from each other properly and would lead to great trouble and danger. By arranging the sprockets and pockets so that one protuberance or sprocket will not completely leave its pocket until the next adjacent protuberance has entered the pocket, there is no danger of the rollers having relative movement but they will all be spaced properly from each other.

Having described the invention, what I claim is:

The combination with a journal having a transversely concave peripheral groove and a journal box having its inside face concentric to the journal and formed with a corresponding transversely concave groove, of bearing rollers disposed between the journal and box and having rolling engagement therewith, each roller having a transversely convex peripheral flange fitting loosely in the grooves of the journal and box and preventing longitudinal movement of the roller, each of said flanges being formed with uniformly spaced relatively shallow peripheral convex protuberances less than the width of the flange and the grooves in the journal box and journal being formed with uniformly spaced concave pockets less than the extreme width of the corresponding groove adapted to receive said protuberances on the flange, the rollers being uniformly spaced from each other and held in this spaced relation by the engagement of the protuberances with said pockets.

In testimony whereof I hereunto affix my signature in the presence of two witnesses.

GEORGE W. DENTON.

Witnesses:
THEODORE S. FISK,
FRED MILLER.

Copies of this patent may be obtained for five cents each, by addressing the "Commissioner of Patents, Washington, D. C."